(12) United States Patent
Maeda

(10) Patent No.: US 9,628,648 B2
(45) Date of Patent: Apr. 18, 2017

(54) INFORMATION PROCESSING APPARATUS, PRINTING APPARATUS, METHOD FOR CONTROLLING INFORMATION PROCESSING APPARATUS, AND METHOD FOR CONTROLLING PRINTING APPARATUS

(71) Applicant: CANON KABUSHIKI KAISHA, Tokyo (JP)

(72) Inventor: Yuuki Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/083,190

(22) Filed: Nov. 18, 2013

(65) Prior Publication Data

US 2014/0139857 A1 May 22, 2014

(30) Foreign Application Priority Data

Nov. 22, 2012 (JP) .................................. 2012-256669

(51) Int. Cl.
| | |
|---|---|
| G06K 15/00 | (2006.01) |
| G06F 3/12 | (2006.01) |
| H04N 1/00 | (2006.01) |
| G06K 15/16 | (2006.01) |
| G06K 15/02 | (2006.01) |

(52) U.S. Cl.
CPC ......... *H04N 1/00631* (2013.01); *G06K 15/16* (2013.01); *G06K 15/1806* (2013.01); *H04N 1/0032* (2013.01); *H04N 1/00408* (2013.01); *H04N 1/00482* (2013.01); *G06K 15/408* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,026,042 A * | 6/1991 | Miller ................... | B65H 1/266 |
| | | | 271/119 |
| 7,464,333 B2 * | 12/2008 | Yamamoto ........ | G06F 17/30905 |
| | | | 358/1.1 |

(Continued)

FOREIGN PATENT DOCUMENTS

| | | |
|---|---|---|
| CN | 102111517 A | 6/2011 |
| CN | 102636982 A | 8/2012 |

(Continued)

*Primary Examiner* — Marcus T Riley
(74) *Attorney, Agent, or Firm* — Canon U.S.A., Inc. IP Division

(57) ABSTRACT

An information processing apparatus causes a sheet processing apparatus to eject a sheet before a process of a job starts when the process for ejecting the sheet is set for the job, before the process of the job starts. A control method for controlling a printing apparatus includes determining whether a setting unit has made, for a job, a setting to cause the sheet processing apparatus to eject the sheet printed with the printing apparatus and discharged to the sheet processing apparatus, before the printing apparatus starts processing the job, and controlling the sheet processing apparatus to eject the sheet before the printing apparatus starts processing the job when it is determined that the setting unit has made, for the job, the setting to cause the sheet processing apparatus to eject the sheet.

14 Claims, 11 Drawing Sheets

(56) References Cited

U.S. PATENT DOCUMENTS

| | | | | |
|---|---|---|---|---|
| 8,102,546 | B2* | 1/2012 | Ebuchi | H04N 1/2307 358/1.12 |
| 8,632,068 | B2* | 1/2014 | Takimoto | G03G 15/6552 271/220 |
| 8,717,583 | B2* | 5/2014 | Igarashi | G03G 15/655 271/3.14 |
| 8,811,831 | B2* | 8/2014 | Wakana | B41J 13/106 399/15 |
| 8,894,065 | B2* | 11/2014 | Takayama | B41J 13/0009 271/202 |
| 2008/0062458 | A1* | 3/2008 | Inui | B41J 11/485 358/1.15 |
| 2008/0180711 | A1* | 7/2008 | Ebuchi | H04N 1/2307 358/1.12 |
| 2008/0259386 | A1* | 10/2008 | Fujino | G06F 3/1207 358/1.15 |
| 2011/0058871 | A1* | 3/2011 | Motoyama | B65H 33/06 399/364 |
| 2012/0013948 | A1* | 1/2012 | Morooka | G06F 3/1203 358/1.15 |
| 2012/0063831 | A1* | 3/2012 | Wakana | B41J 13/106 400/76 |
| 2013/0009357 | A1* | 1/2013 | Takimoto | G03G 15/6552 271/225 |
| 2013/0043639 | A1* | 2/2013 | Takayama | B41J 13/0009 271/3.14 |
| 2014/0139857 | A1* | 5/2014 | Maeda | H04N 1/0032 358/1.12 |

FOREIGN PATENT DOCUMENTS

| | | |
|---|---|---|
| JP | 5-155511 A | 6/1993 |
| JP | 2002011922 A | 1/2002 |
| JP | 2005200109 A | 7/2005 |
| JP | 2007-219495 A | 8/2007 |

* cited by examiner

INFORMATION PROCESSING APPARATUS, PRINTING APPARATUS, METHOD FOR CONTROLLING INFORMATION PROCESSING APPARATUS, AND METHOD FOR CONTROLLING PRINTING APPARATUS

BACKGROUND OF THE INVENTION

1. Field of the Invention

The present invention relates to an information processing apparatus, a printing apparatus, a method for controlling an information processing apparatus, and a method for controlling a printing apparatus.

2. Description of the Related Art

There are sheet processing apparatuses that perform processing on a sheet conveyed from a printing apparatus. Sheet processing apparatuses include a stacker for stacking a large number of sheets. The stacker allows a large number of print products to be continuously printed and thus can increase productivity.

Japanese Patent Application Laid-Open No. 2007-219495 discloses a printing apparatus that conveys a sheet to a stacker. According to Japanese Patent Application Laid-Open No. 2007-219495, in consideration of the length of time in ejecting the printed sheets from the stackers, print jobs other than the jobs designating a tray of the same stacker can be executed to discharge the sheets in parallel, which increases productivity when the user ejects the printed products from the stackers. Japanese Patent Application Laid-Open No. 2007-219495 further discloses a technique for controlling a job to promptly eject the printed products by an automatic ejection from the stacker upon the completion of the job.

On the other hand, when a print job which discharges a sheet to a stacker is performed in a printing system such as a print on demand (POD), there is a need to discharge the printed products in specific sets to the same stacker because the user does not want to divide the printed products in the middle of the job.

For example, when the tray cannot hold the printed products in the middle of a copy, printing is continued using another sheet discharge destination or using the same sheet discharge destination after the printed products on the tray are taken out. In such a case, it may be desirable that the sheet discharge destination is switched at the time of the completion of a previous copy.

In addition to assembling in units of copies, there are many needs to discharge sheets to a tray, for example, discharge sheets in sets of jobs for which the same offline finishing is taken, and in sets of jobs in which a plurality of jobs is packaged as a unit. In light of these needs, there is a technique that detects the number of remaining sheets that the stacker can yet stack and obtains the number of sheets to be output in a job after this so as to calculate whether all the job to be printed can be output to the stacker. Thus, the technique disclosed in Japanese Patent Application Laid-Open No. 5-155511 determines the sheet discharge destination.

However, the user cannot make a reservation in order to eject sheets before the execution of a job in the conventional techniques.

The technique in Japanese Patent Application Laid-Open No. 2007-219495 does not allow the reservation for ejecting a sheet before the execution of a job although the reservation can be made to eject a sheet after the completion of a job.

The technique in Japanese Patent Application Laid-Open No. 5-155511 does not allow the reservation for ejecting a sheet before the execution of a job because the tray is pulled out only after determining that a tray full occurs.

SUMMARY OF THE INVENTION

According to an aspect of the present invention, an information processing apparatus includes a setting unit configured to set an ejection instruction to cause a sheet processing apparatus to eject a sheet printed with a printing apparatus and discharged to the sheet processing apparatus, before the printing apparatus starts processing of a job, and a transmitting unit configured to transmit the job to the printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<System Configuration>

[System Configuration of Entire Print Environment 10000 Including Printing System 1000]

In dealing with the problems considered in Description of the Related Art, a first exemplary embodiment assumes print environments such as a POD environment which is different from office environment. Thus, the entire system environment in the site of the POD environment (print environment 10000 in FIG. 1) including a printing system 1000 will be described. Such a print environment itself is one of features of the present exemplary embodiment.

In the present exemplary embodiment, the POD system is referred to as the print environment 10000 to which the printing system 1000 can be applied because the printing system 1000 is also suitable to the POD environment.

Figure 1:
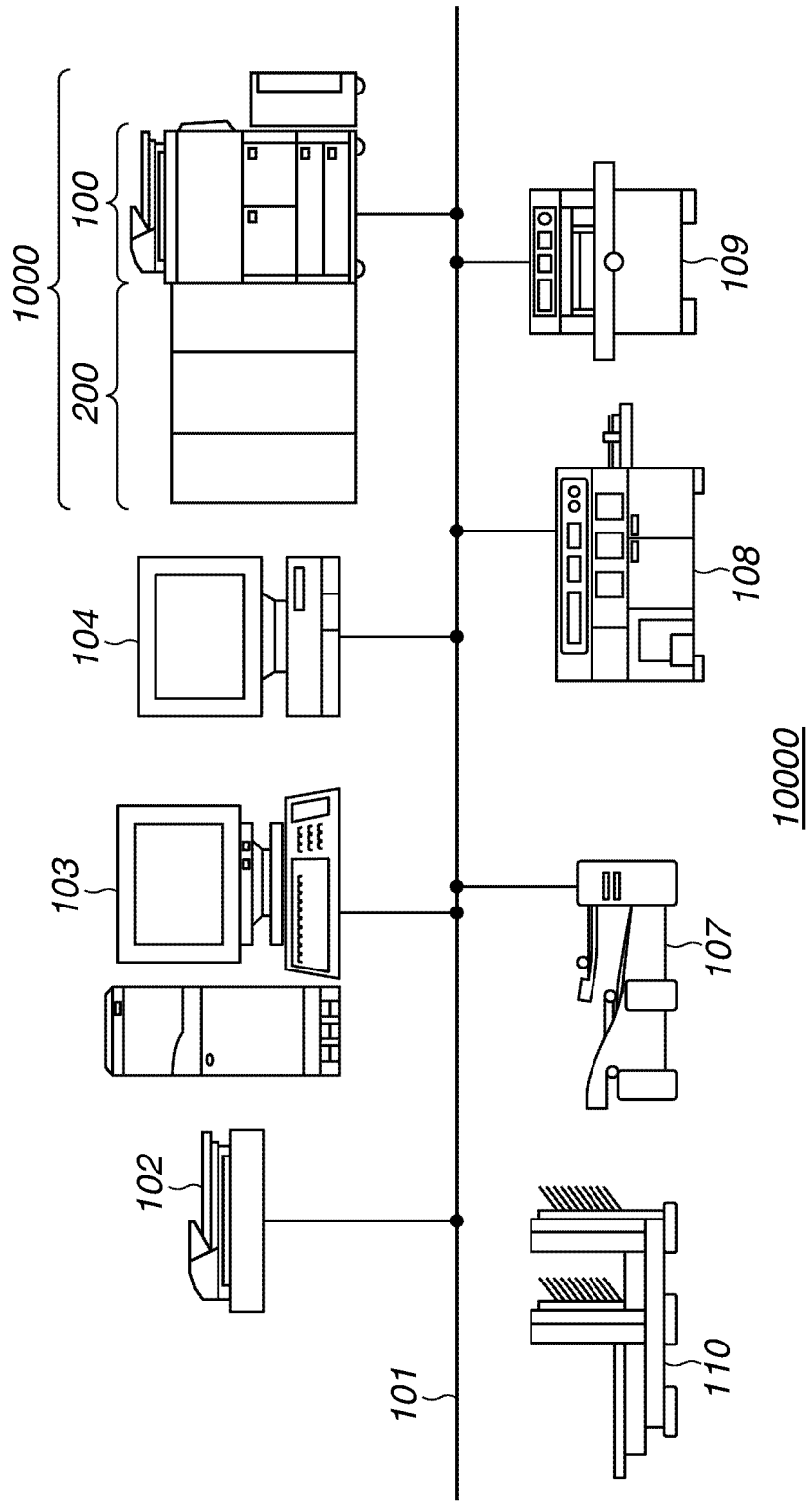
FIG. 1 is a diagram of the entire configuration of a printing system.

FIG. 1 is a diagram illustrating the configuration of the print environment 10000. The present system includes, as the components, the printing system 1000, a server 103, and a client 104. The server 103 and the client 104 are a computer, for example, a personal computer (PC). The system further includes a paper folding machine 107, a cutting machine 109, a saddle stitch bookbinding machine 110, a case bookbinding machine 108, a scanner 102, and the like. As described above, a plurality of apparatuses is included in the print environment 10000.

The printing system 1000 includes, as the components, a printing apparatus 100 and a sheet processing apparatus 200. A multifunction peripheral including a plurality of functions such as a copy function and a print function will be described as an example of the printing apparatus 100 in the present exemplary embodiment. However, the printing apparatus 100 may be a single-function printing apparatus only including a copy function or a print function. The multifunction peripheral is also referred to as a MFP.

In that case, the paper folding machine 107, the case bookbinding machine 108, the cutting machine 109, and the saddle stitch bookbinding machine 110 illustrated in FIG. 1 are defined as the sheet processing apparatus, similarly to the sheet processing apparatus 200 provided in the printing system 1000.

In other words, the paper folding machine 107, the case bookbinding machine 108, the cutting machine 109, and the saddle stitch bookbinding machine 110 each are a device that is capable of processing the sheets of a job printed in the printing apparatus 100 provided in the printing system 1000. For example, the paper folding machine 107 can perform a folding process on the sheets of a job printed in the printing apparatus 100. The cutting machine 109 can perform a cutting process on the sheets of a job printed in the printing apparatus 100 in a unit of a sheet bundle including a plurality of sheets.

The saddle stitch bookbinding machine 110 can perform a saddle stitch bookbinding process on the sheets of a job printed in the printing apparatus 100. The case bookbinding machine 108 can perform a case bookbinding process on the sheets of a job printed in the printing apparatus 100.

However, to enable the sheet processing apparatuses to perform the sheet processes, it is necessary for the operator to eject the products of the job printed in the printing apparatus 100 from a discharge portion of the printing apparatus 100 and then set the printed products on the sheet processing apparatus that processes the products.

As described above, to use the sheet processing apparatuses other than the sheet processing apparatus 200 provided in the printing system 1000, an intervention operation by the operator is required after the print process is performed in the printing apparatus 100.

In other words, an intervention by the operator is not required after the print process is performed in the printing apparatus 100 when the user uses the sheet processing apparatus 200 provided in the printing system 1000 in order to perform a necessary process for the job printed in the printing apparatus 100. This is because the sheets printed in the printing apparatus 100 can directly be supplied from the printing apparatus 100 to the sheet processing apparatus 200.

Specifically, a sheet conveyance path in the printing apparatus 100 can be connected to a sheet conveyance path in the sheet processing apparatus 200. Thus, the sheet processing apparatus 200 and the printing apparatus 100 provided in the printing system 1000 are physically connected to each other. The printing apparatus 100 and the sheet processing apparatus 200 each include a central processing unit (CPU) so as to enable data communications. In other words, the printing apparatus 100 and the sheet processing apparatus 200 are electrically connected to each other.

A control unit provided in the printing system 1000 integrally controls the printing apparatus 100 and the sheet processing apparatus 200 in the present exemplary embodiment. As an example, a controller unit 205 in the printing apparatus 100 in FIG. 2 comprehensively controls the printing apparatus 100 and the sheet processing apparatus 200 in the present exemplary embodiment.

A PC is an example of external devices such as the server 103, or the client 104. The printing apparatus 100 prints the print data of a job to be processed as to which a print execution request is transmitted through a network 101 from the PC.

[Internal Configuration of Printing System 1000 (Mainly Software Configuration)]

Figure 2:
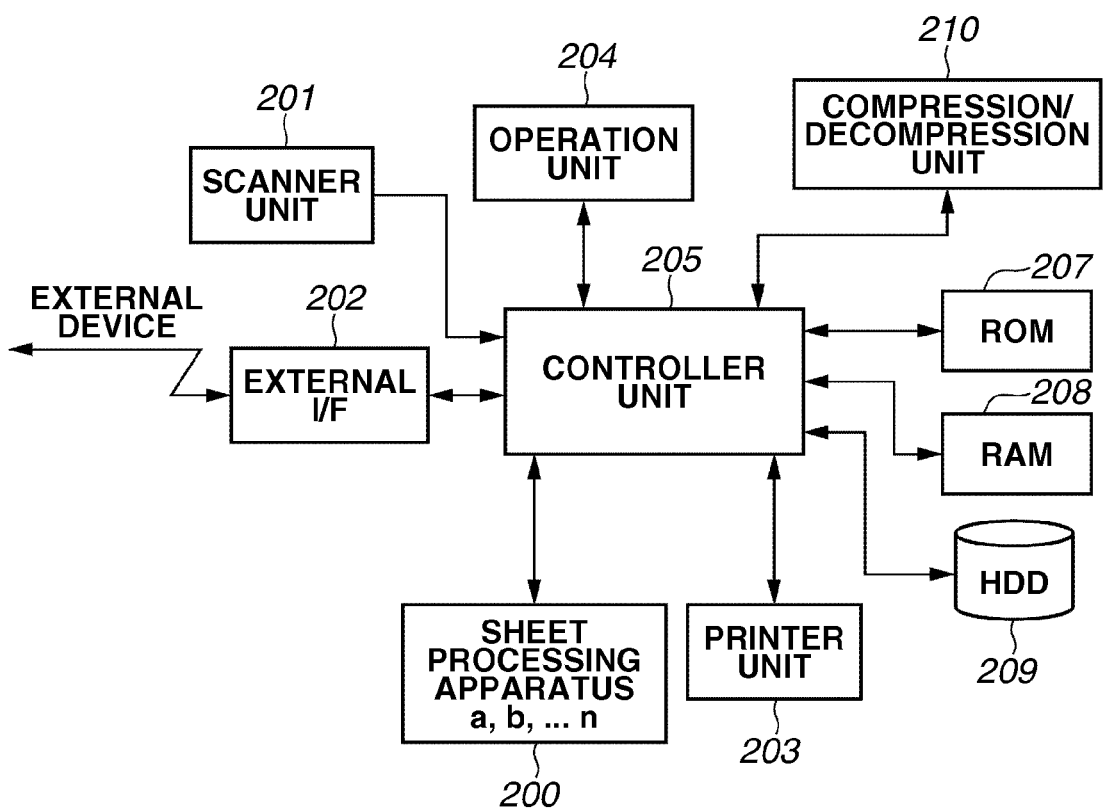
FIG. 2 is a block diagram of the internal configuration of the printing system.

FIG. 2 is a block diagram illustrating the internal configuration (mainly, the software configuration) of the printing system 1000 in FIG. 1. All the units provided in the printing system 1000 in FIG. 2 other than the sheet processing apparatus 200 (strictly, a group of sheet processing apparatuses that can be constituted by a plurality of in-line type sheet processing apparatuses) are included in the printing apparatus 100 in the present exemplary embodiment.

In other words, the sheet processing apparatus 200 is detachable from the printing apparatus 100 and can be provided as an option for the printing apparatus 100. This configuration can effectively provide the necessary number of in-line finishers that are required in the POD environment. The printing system 1000 has a configuration to be described below.

The printing apparatus 100 includes a nonvolatile memory, for example, a hard disk 209 (hereinafter, referred to as HD) capable of storing the data of a plurality of jobs to be processed. The printing apparatus 100 also has a copy function to print job data in the printer unit 203 via the HD. The job data is received from the scanner unit 201 included in the printing apparatus 100 body. The printing apparatus 100 also has a print function to print the job data received from an external device in the printer unit 203 via the HD through an external I/F unit 202 that is an exemplary communication unit. The external device is, for example, the server 103 or the client 104. The printing apparatus 100 is a MFP type printing apparatus (also referred to as an image forming apparatus) including such functions.

The printing apparatus 100 in the present exemplary embodiment may have any configuration, for example, a color printing apparatus or a monochromatic printing apparatus, as long as various controls can be carried out which are described in the present exemplary embodiment.

The printing apparatus 100 in the present exemplary embodiment includes a scanner unit 201 that reads an original image and performs an image processing on the read image data. The printing apparatus 100 further includes the external I/F unit 202 that transmits and receives image data or the like with a facsimile, a network communication device, or an external dedicated apparatus. The printing apparatus 100 further includes the hard disk 209 capable of storing the image data of a plurality of print target jobs received from one of the scanner unit 201 and the external I/F unit 202. The printing apparatus 100 further includes the printer unit 203 that prints the data of the print target job stored in the hard disk 209 on a print medium.

The printing apparatus 100 further includes an operation unit 204 that is an exemplary user interface unit provided in the printing system 1000 and that includes a display unit. The display unit, the keyboard, or the mouse of the external apparatuses such as the server 103 and the client 104 are other exemplary user interface units provided in the printing system 1000.

The controller unit (a control unit or a CPU) 205 that is an exemplary control unit provided in the printing system 1000 comprehensively controls the process and operation of each unit provided in the printing system 1000. The ROM 207 stores various control programs required in the present exemplary embodiment including programs to perform various processes or the like in the flowcharts to be described below. The ROM 207 further stores a display control program for displaying various UI screens including the user interface screen illustrated in the drawing (hereinafter, referred to as UI screen) on the display unit in the operation unit 204.

The controller unit 205 causes the printing apparatus 100 to perform various operations to be described in the present exemplary embodiment by reading and executing the program in the ROM 207. The ROM 207 also stores, for example, a program for interpreting the page description language (PDL) data received from the server 103 or the client 104 through the external I/F 202 and developing the data as raster image data (bitmap image data). The programs are dealt with by software.

The ROM 207 is a read-only memory and previously stores various programs including programs of a boot sequence, font information, and the like; and the above-mentioned programs. The RAM 208 is readable and writable memory and stores the image data transmitted from the scanner unit 201 or the external I/F 202 through the memory controller 206, various programs, and setting information.

The hard disk (HD) 209 is a mass-storage device that stores the image data compressed by the compression/decompression unit 210. The HD 209 is configured to be capable of storing a plurality of pieces of data such as the print data of a process target job. The controller unit 205 controls the printing apparatus 100 so as to enable the printer unit 203 to print, through the HD 209, the data of a process target job that has been input from various input units such as the scanner unit 201 and the external I/F unit 202. At that time, the controller unit 205 accumulates the image data in the order of pages to be printed and deletes the accumulated image data when it is detected that the page has been discharged from the printing apparatus 100. The controller unit 205 further deletes the process target print job from the HD 209 when it is detected that all the accumulated image data has been deleted after all the data of the print job have been discharged from the printing apparatus 100.

The controller unit 205 also controls the printing apparatus 100 so that the print data can be transmitted to an external device through the external I/F 202. Thus, the controller unit 205 controls the printing apparatus 100 to perform the processes for outputting the data of the target job stored in the HD 209. The controller unit 205 deletes the data of the job after the printing apparatus 100 has completed the output processes. The compression/decompression unit 210 compresses and decompresses the image data in the RAM 208 or the HD 209 stored under various compression standards such as Joint Bi-level Image Experts Group (JBIG) and Joint Photographic Experts Group (JPEG).

In the above-mentioned configuration, the controller unit 205 that is an exemplary control unit provided in the printing system 1000 also controls the operation of the in-line type sheet processing apparatus 200 as illustrated in FIG. 1.

Figure 3:
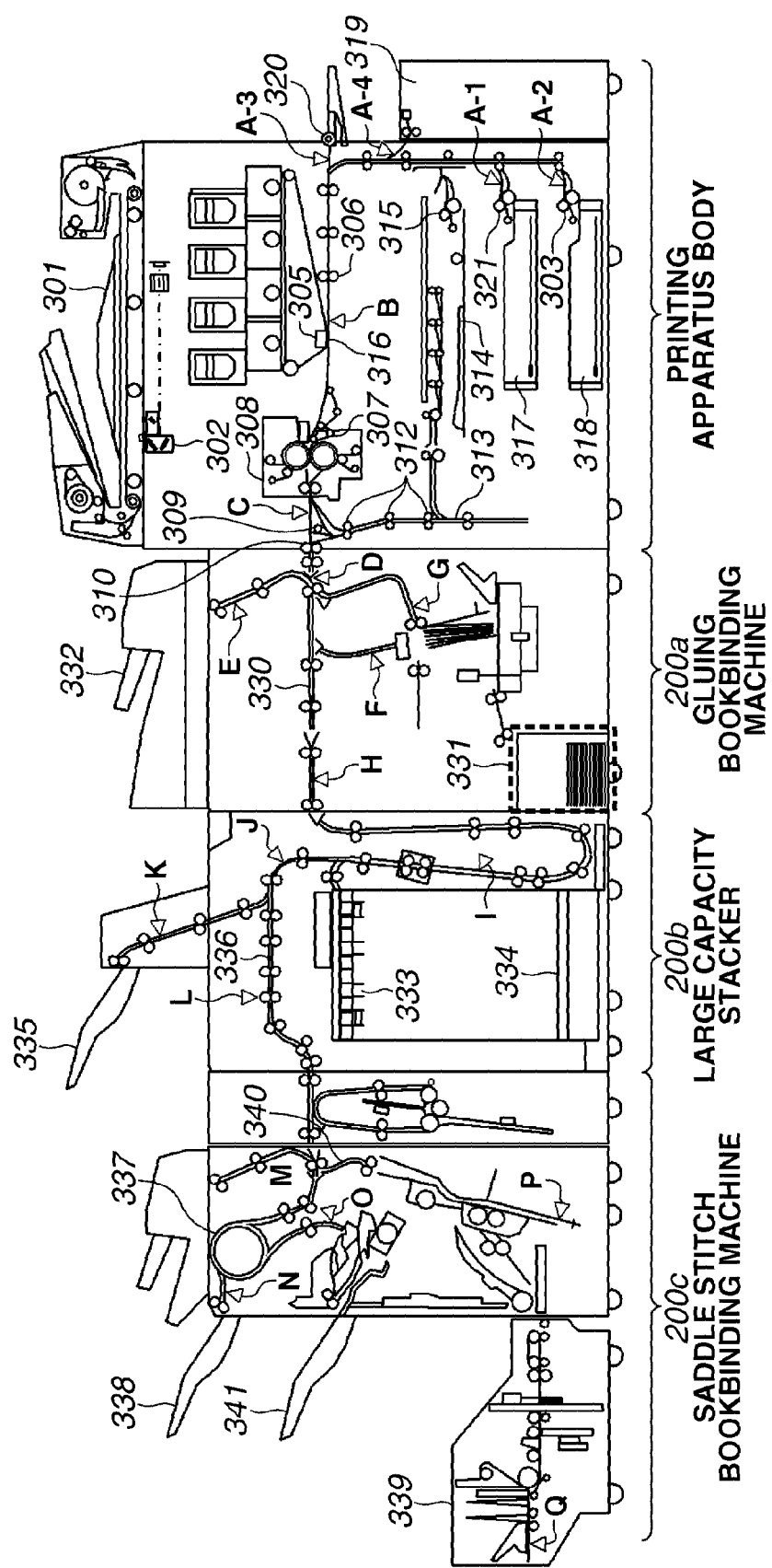
FIG. 3 is a cross-sectional view of the configuration of the printing system illustrated in FIG. 1.

FIG. 3 is a cross-sectional view of the configuration of the printing system 1000 illustrated in FIG. 1. The configuration will be described herein together with the operations for executing a copy job.

In FIG. 3, an automatic document feeder (ADF) 301 provided on the scanner unit 201 separates a plurality of sheets of document that the user has set in a document tray, one by one from the first sheet to convey the sheets to a document positioning glass plate. The reading unit 302 reads the image of the document conveyed to the document positioning glass plate with a charge coupled device (CCD) to convert the image into image data. The controller unit 205 stores the converted image data in a memory such as the RAM 208 or HD 209.

The printing apparatus 100 is a tandem type color printer including a plurality of photosensitive members (drums) and paper feed units such as sheet cassettes 317 and 318, and a manual feed tray 320 to feed a sheet from one of the paper feed units. A paper feed deck 319 capable of storing a large number of sheets is also connected to the printing apparatus 100 as a paper feed unit. This can feed a sheet from the paper feed deck 319.

When the sheet fed from one of the paper feed units is conveyed to a registration roller 306, the printing apparatus 100 temporarily stops to synchronize with the intermediate transfer belt 305. The printing apparatus 100 can feed a sheet for the print of the next page from either one of the sheet cassettes 317 and 318, the paper feed deck 319, and a manual feed tray 320 when there is a sheet waiting for transfer at the registration roller 306. Feeding a sheet as described above can shorten the conveying intervals of the sheets and thus can increase the productivity of the print.

The printing apparatus 100 transfers the image data temporarily stored in the RAM 208 or the HD 209 to the printer unit 203 and the image data is converted into four-color recording laser beams that are yellow (Y), magenta (M), cyan (C), and black (K) in a laser recording unit (not illustrated in the drawings). Each of the recording laser beams is emitted to the photosensitive member of each color to form an electrostatic latent image corresponding to each color in the photosensitive member. Then, the image is developed using four-color toners provided from toner cartridges and the visualized toner image is temporarily transferred from the photosensitive member to an intermediate transfer belt 305.

The intermediate transfer belt 305 rotates in the clockwise direction of the drawing at a constant rate. When the intermediate transfer belt 305 rotates and reaches a predetermined position, the printing apparatus 100 starts conveying the sheet standing by at the registration roller 306. The predetermined position is a position where the portion near the top of the sheet is conveyed to a secondary transfer position 316 when the top of the image transferred on the intermediate transfer belt 305 reaches the secondary transfer position 316. As described above, the printing apparatus 100 transfers the toner image on the intermediate transfer belt 305 to the sheet at the secondary transfer position 316.

A belt 307 further conveys the sheet on which the toner image has been transferred. The printing apparatus 100 fixes the toner on the sheet using the pressure and heat of a fixing device 308. After that, the printing apparatus 100 conveys the sheet through a sheet conveyance path to discharge the sheet.

The paper discharge flapper 309 is capable of swinging around the pivot shaft to determine the conveyance direction of a sheet. When the paper discharge flapper 309 swings in the clockwise direction of the drawing and is fixed at the position, the sheet discharged from the fixing device 308 is laterally conveyed without changing the direction. A discharge roller 310 conveys the sheet to a gluing bookbinding machine 200a that is one of the sheet processing apparatuses 200. As described above, the printing apparatus 100 performs a one-side printing.

On the other hand, when the printing apparatus 100 prints images on both sides of a sheet, the paper discharge flapper 309 swings in the counterclockwise direction of the drawing and is fixed at the position. The sheet discharged from the fixing device 308 changes its direction downward and is conveyed to a two-sided conveying unit. The two-sided conveying unit includes a reversing flapper (not illustrated in the drawings), a reversing roller 312, a reversing guide 313 and a two-sided tray 314. The reversing flapper 311 swings around the pivot shaft to determine the conveyance direction of a sheet.

When the printing apparatus 100 performs a two-sided printing, the controller unit 205 controls the reversing flapper to swing in the counterclockwise direction of the drawing to send the sheet having a first side on which an image has been printed, to the reversing guide 313 through the reversing roller 312. Then, the controller unit 205 temporarily stops reversing rollers provided at the entrance of the reversing guide while the rear edge of the sheet is sandwiched between the reversing rollers. The controller unit 205 further swings the reversing flapper in the clockwise direction of the drawing to rotate the reversing rollers in a opposite direction. As a result, the controller unit 205 performs control to switch back the sheet and guide the sheet to the two-sided tray 314, in a state where the rear edge and leading edge switch their positions.

The two-sided tray 314 temporarily holds the sheet. After that, a re-feeding roller 315 sends the sheet to the registration roller 306 again. At that time, the sheet is sent to the registration roller 306 in a state where a second side of the sheet faces to the intermediate transfer belt 305. The second side is the side opposite to the first side on which the toner has been transferred in the first transfer process. Similarly to the transfer process of the first side, an image is formed on the second side of the sheet. Then, the discharge roller 310 conveys the sheet on which the image has been formed to the gluing bookbinding machine 200a that is one of the sheet processing apparatuses 200 after the fixing device 308 fixes the image formed on the second side of the sheet. Thus, the printing apparatus 100 performs a two-sided printing.

After printing images on one or both sides of the sheet, the printing apparatus 100 conveys the sheet selectively to the gluing bookbinding machine 200a, a large capacity stacker 200b, or a saddle stitch bookbinding machine 200c which are the sheet processing apparatuses 200, according to the print setting from the operation unit 204.

When the user sets the apparatus to execute a gluing bookbinding process, the printing apparatus 100 conveys the sheets to the gluing bookbinding machine 200a. The gluing bookbinding machine 200a performs a bookbinding process and discharges the sheets to a bound book discharge unit 331. In other words, in the bookbinding process, the gluing bookbinding machine 200a subjects a plurality of sheets on which the images have been printed in the printing apparatus 100, to case binding with a sheet fed from an inserter 332 as necessary. The bound book discharge unit 331 accumulates the bound printed products.

When the user sets the apparatus to execute a process for stacking a large number of sheets, the printing apparatus 100 conveys the sheets on which the images have been printed in the printing apparatus 100 to the large capacity stacker 200b through a sheet conveyance path 330 in the gluing bookbinding machine 200a. The large capacity stacker 200b discharges the received sheets to an escape tray 334 or a stacking unit 333. Hereinafter, the large capacity stacker 200b will be described together with its appearance in detail using FIGS. 3 and 4.

Figure 4:
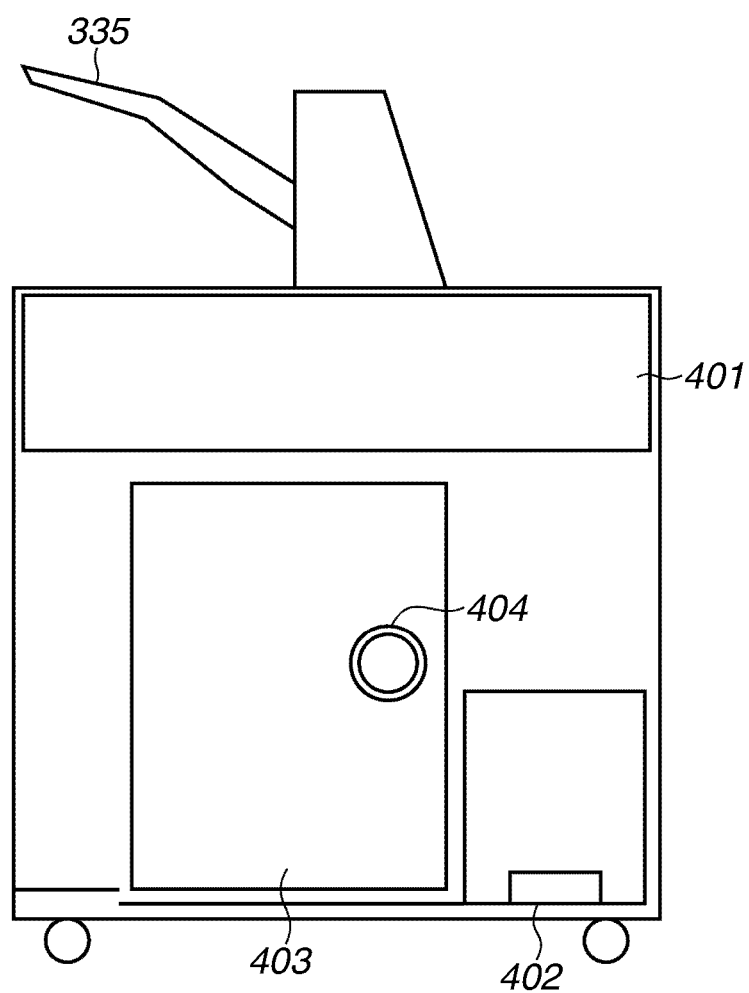
FIG. 4 is a diagram of the configuration of the large capacity stacker illustrated in FIG. 3.

FIG. 4 is a diagram of the configuration of the large capacity stacker 200b illustrated in FIG. 3. The large capacity stacker 200b includes a conveyance path upper cover 401, a conveyance path right cover 402, a front cover 403, and an open button 404 according to the present exemplary embodiment. The front cover 403 can be opened by a press of the open button 404 or an opening instruction (sheet ejection instruction) from the controller unit 205 due to, for example, the occurrence of tray full.

When an instruction to open the front cover 403 is received, the large capacity stacker 200b slides the front cover 403 upward to open the front cover 403. The large capacity stacker 200b moves the stacking unit 333 in FIG. 3 downward in order to move the processed products from the stacking unit 333 to the escape tray 334 in the large capacity stacker 200b. When moving of the processed products to the escape tray 334 is finished, the large capacity stacker 200b controls the escape tray 334 to protrude from the large capacity stacker 200b so that the user can eject the processed products.

At the same time, the large capacity stacker 200b lifts the stacking unit 333 to the position in which the stacking unit 333 can stack sheets and the sheet discharge is enabled. After the stacking unit 333 becomes capable of accepting the sheet discharge, the large capacity stacker 200b notifies the controller unit 205 that the stacking unit 333 becomes capable of accepting the sheet discharge. A status of the escape tray 334 protruding from the large capacity stacker 200b while stacking the processed products thereon is referred to as a front loading status. The process for protruding the escape tray 334 from the large capacity stacker 200b is referred to as a front loading process.

When the large capacity stacker 200b detects that the user has ejected the processed products from the escape tray 334, the large capacity stacker 200b automatically returns the escape tray 334 into the large capacity stacker 200b, and then slides and closes the front cover 403. The configuration described above enables the large capacity stacker 200b to continuously output the sheets to the stacking unit 333 even before the user ejects the processed products from the escape tray 334. This can realize a printing system having a higher productivity.

When the user does not make a setting of a sheet process, the printing apparatus 100 conveys the sheets on which the images have been printed in the printing apparatus 100 to the saddle stitch bookbinding machine 200c through the sheet conveyance path 330 in the gluing bookbinding machine 200a and a sheet conveyance path 336 in the large capacity stacker 200b. After receiving the sheets, the saddle stitch bookbinding machine 200c discharges the sheets to a paper discharge unit 338 through a sheet conveyance path 337.

When the user sets the apparatus to execute a staple process, the saddle stitch bookbinding machine 200c accumulates the received sheets in an intermediate tray through the sheet conveyance path 337. When a bundle of sheets to be stapled is accumulated in the intermediate tray, the saddle stitch bookbinding machine 200c staples the bundle of sheets and then discharges the stapled bundle to a paper discharge unit 341.

When the user sets the apparatus to execute a saddle stitch bookbinding process, the saddle stitch bookbinding machine 200c performs a saddle stitch bookbinding process on the received sheets and then discharges the processed sheets to a paper discharge unit 339.

As described above, the printing system 1000 performs the processes such as paper feeding, printing, post-processing, and paper discharging.

The printing system 1000 includes a sheet detection sensor on each of the sheet conveyance paths in the printing apparatus 100, the gluing bookbinding machine 200a, the large capacity stacker 200b, and the saddle stitch bookbinding machine 200c. Specifically, the sheet detection sensor is provided, for example, at the entrance and exit of each apparatus, or at the branch or junction point of each sheet conveyance path. The triangles in FIG. 3 indicate exemplary positions in which the sheet detection sensors are provided. Numerals A to Q indicate sheet detection sensors. The controller unit 205 detects the presence or absence of the sheets conveyed through the sheet conveyance paths and the positions of the sheets by receiving signals from the sheet detection sensors.

For example, when a sheet detection sensor continues sending signals for a predetermined period of time or more, the controller unit 205 determines that a retention jam (clog) of a sheet occurs at the position covered by the sensor that continuously sends signals. When a sheet does not pass through the next sheet detection sensor while a predetermined time or more has elapsed after the sheet have passed through a certain sheet detection sensor, the controller unit 205 determines that a sheet delay jam (clog) occurs between the sheet sensors.

The controller unit 205 interrupts the print and displays the position of the sheet to be removed and the process for removing the sheet as a guidance according to the signals from the sheet detection sensors when a sheet jam (clog) occurs on a sheet conveyance path in the printing system 1000.

As a result, the user grasps where the sheet to be removed is retained in the printing system 1000 and removes the sheet from the sheet conveyance path by opening the door of the apparatus according to the guidance. After removing all the sheet to be removed, the user instructs the controller unit 205 to resume the print through the operation unit 204. When receiving the instruction for the resumption of the print, the controller unit 205 resumes the print.

Sheet detection sensors A-1, A-2, A-4, and A-3 working as paper feed sensors are provided at paper feed ports of the paper feed units, namely, at paper feed ports of the sheet cassette 317 and 318, the paper feed deck 319, and the manual feed tray 320, respectively. The paper feed sensors detect the fed sheets and transmit the sheet detection signals to the controller unit 205. The controller unit 205 counts the number of sheets fed from each of the paper feed unit according to the sheet detection signals received from the paper feed sensors. The controller unit 205 stores the counted values in the RAM 208. Thus, the controller unit 205 can grasp the number of sheets fed from each of the paper feed units as a result of executing a job.

Although a four-drum (4D) type color MFP has been described as the printing apparatus 100 in the present exemplary embodiment, the printing apparatus 100 is not limited to this configuration. A monochrome MFP or a one-drum (1D) type color MFP may also be used.

While a copy job has been taken in the above embodiment as an example for describing the operations and the configuration of the printing system 1000, the printing system 1000 similarly can perform a print job by using the print data from the external I/F in the present configuration instead of the image data from the scanner unit.

[Configuration of Operation Unit 204 as Exemplary UI Unit in Printing System 1000]

Here, the operation unit 204 that is an exemplary user interface unit (hereinafter, referred to as UI unit) for the printing system 1000 and included in the printing apparatus 100 of the printing system 1000 will be described using, for example, FIG. 5.

Figure 5:
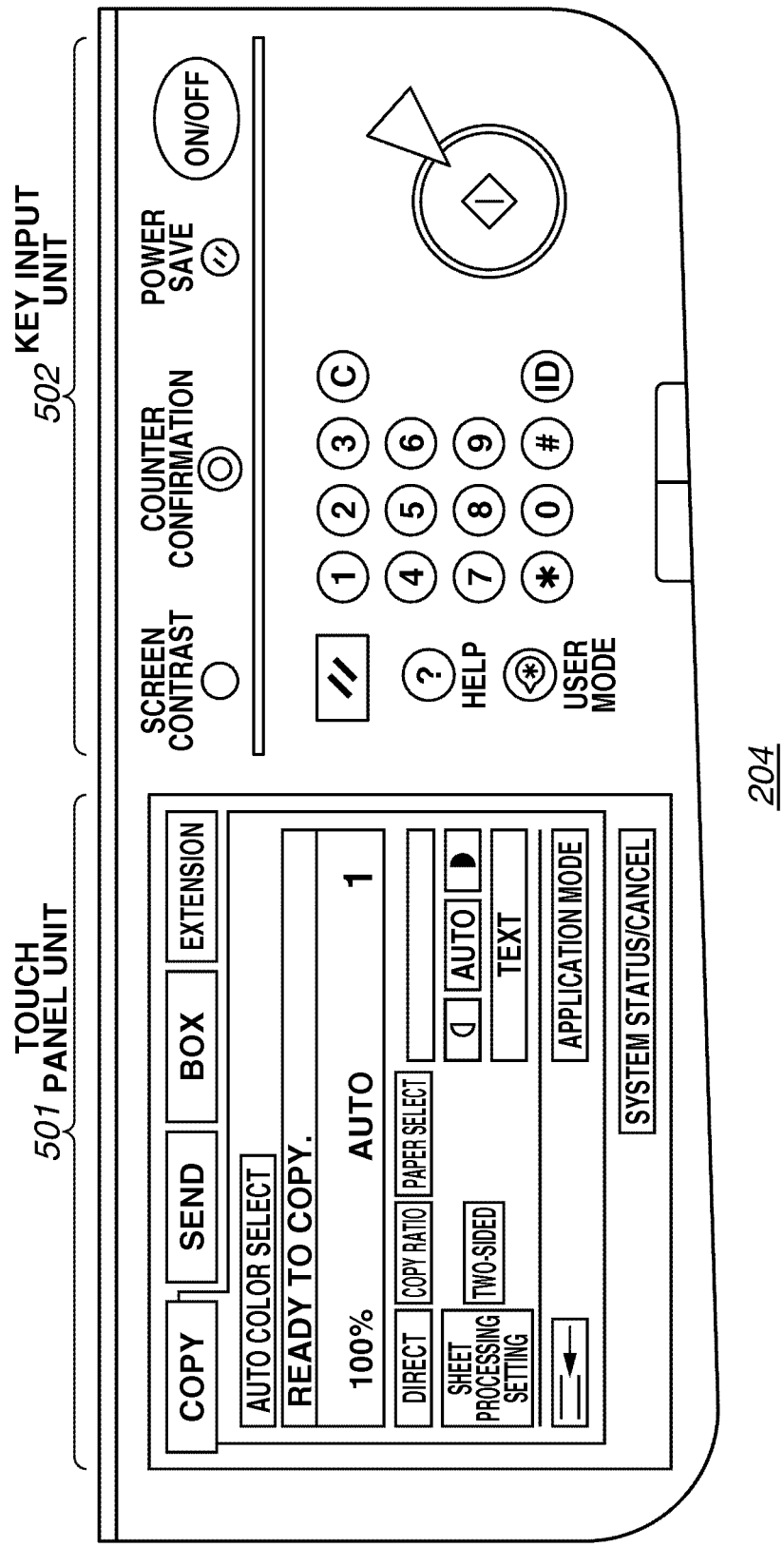
FIG. 5 is a plan view of the configuration of the operation unit illustrated in FIG. 2.

FIG. 5 is a plan view of the configuration of the operation unit 204 illustrated in FIG. 2.

In FIG. 5, the operation unit 204 includes a key input unit 502 capable of receiving the user operation with a hardware key, and a touch panel unit 501 that is an exemplary display unit capable of receiving the user operation with a software key (display key).

With the configuration as described above, the controller unit 205 that is an exemplary control unit provided in the printing system 1000 performs the controls as described below.

Figure 6:
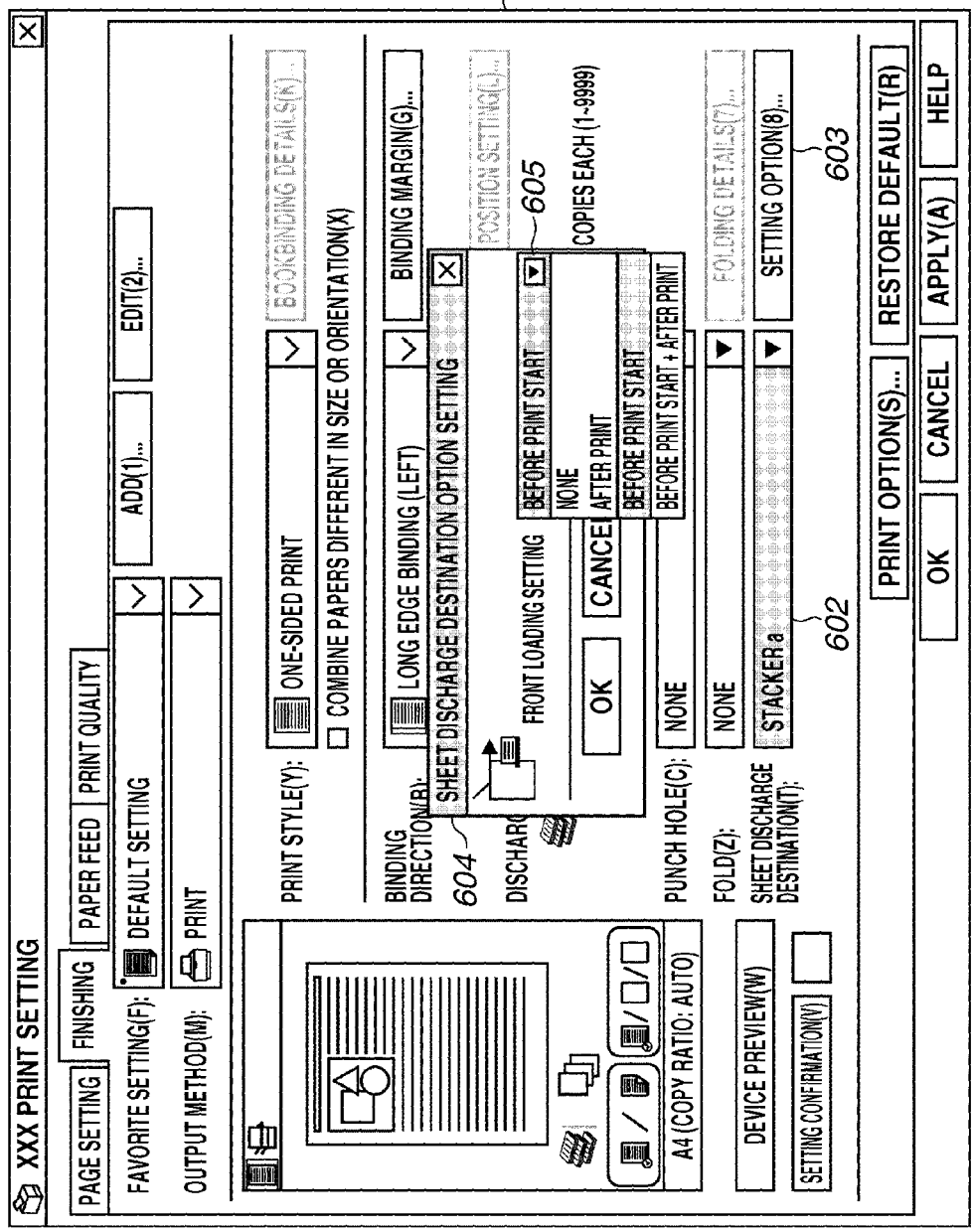
FIG. 6 is a diagram of a user interface (UI) screen displayed on the client illustrated in FIG. 1.
Figure 7:
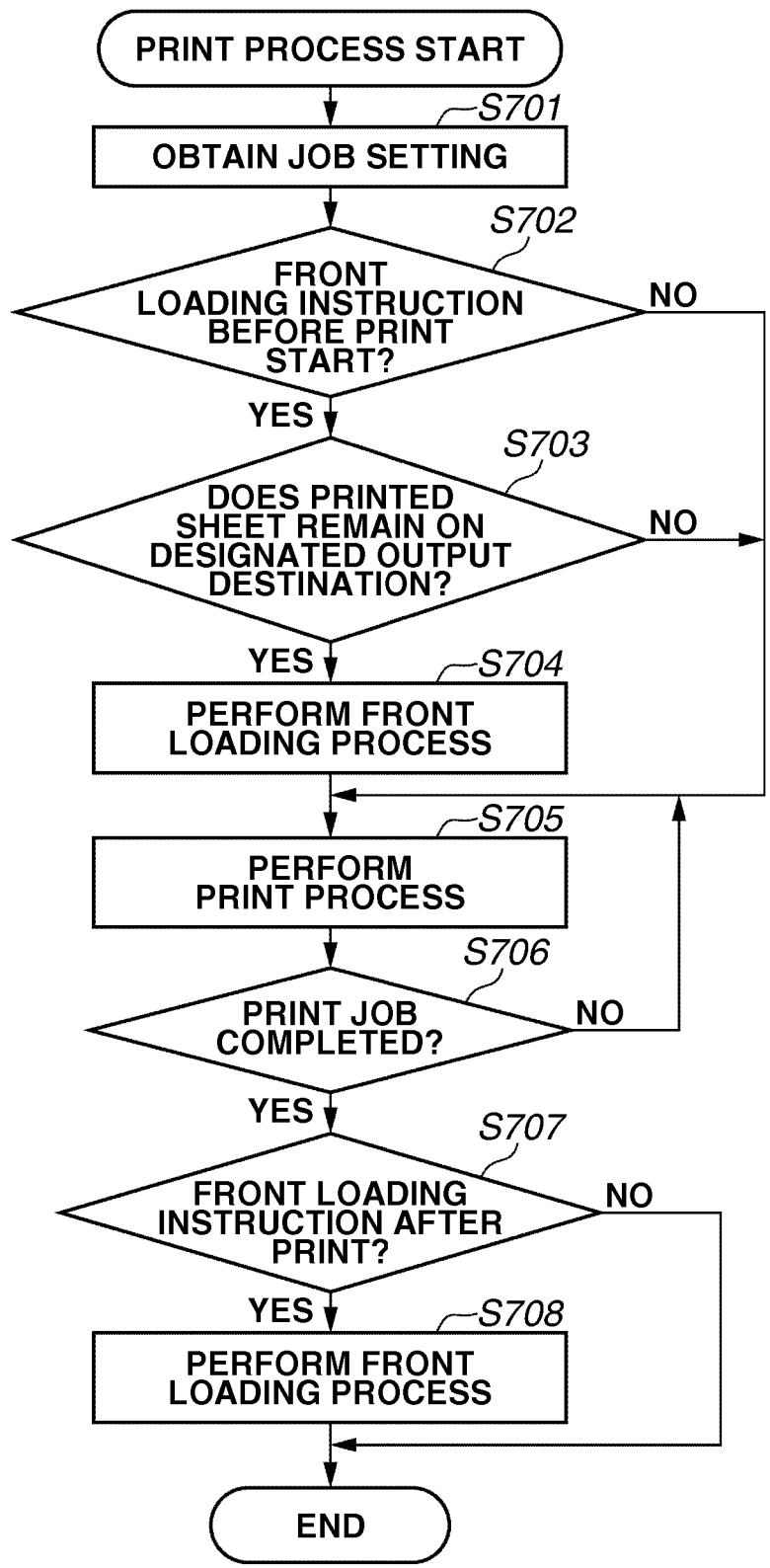
FIG. 7 is a flowchart of a method for controlling the printing system.

The desirable exemplary embodiment of the present invention will be described using FIG. 6 illustrating an exemplary setting of the printer driver screen and FIG. 7 illustrating a flowchart of a typical control when a stacker discharges a paper.

FIG. 7 is a flowchart of a method for controlling a printing system 1000 of the present exemplary embodiment. The present exemplary embodiment is a typical control method when a stacker discharges a paper. The present process is executed by the controller unit 205. The controller unit 205 performs each procedure by reading and executing a program from the ROM 207.

First, a method for a job processing on the information processing apparatus side with respect to a setting of a front loading instruction from a printer driver will be described as an exemplary setting of a print job using FIG. 6. FIG. 6 illustrates an exemplary printer driver screen. A printer driver is an application provided within the client PC 104 in the print environment 10000, which converts arbitrary data into page description language (PDL).

The printer driver opens a printer driver screen 601 when a print instruction is received from the user. At that time, the printer driver performs control to display an option setting button 603 to receive the selection of the option setting button 603 when the selection of a stacker is received as a paper discharge destination from a paper discharge destination selection pull-down 602. The printer driver displays a paper discharge destination option setting screen 604 as popup when the selection of the option setting button 603 is received.

The paper discharge destination option setting screen 604 enables the printer driver to receive a front loading setting from a front loading setting selection pull-down 605. The printer driver creates print data described with the PDL according to the received settings. After that, the printer driver transmits the print data to the printing system 1000. The printing system 1000 interprets the received print data with the controller unit 205 and stores the interpretation result in the HD 209. The flow of the transmission of the print data or the flow of the interpretation of the print data when the printing system 1000 receives the print data are the same as a normal print control, so that the description of the flows are herein omitted.

Next, a typical control when the stacker discharges a paper will be described using the flowchart in FIG. 7. In step S701, the controller unit 205 obtains the setting of a print target job stored in the HD 209 when the user starts a print process. Then, the process proceeds to step S702. In step S702, the controller unit 205 determines whether there is an instruction for front loading before the start of the print in the obtained job setting. When there is not an instruction for front loading before the start of the print (NO in step S702), the process proceeds to step S705 to perform a normal print process. When it is determined in step S702 that there is an instruction for front loading before the start of the print (YES in step S702), the process proceeds to step S703. In step S703, the controller unit 205 determines whether a printed product remains on the paper discharge destination on which the front loading is to be executed. When any printed product does not remain (NO in step S703), the process proceeds to step S705 to perform a normal print process.

When it is determined in step S703 that a printed product remains on the paper discharge destination on which the front loading is to be executed (YES in step S703), the process proceeds to step S704. In step S704, the controller unit 205 gives a front loading instruction to the large capacity stacker 200*b*. When the large capacity stacker 200*b* notifies the controller unit 205 that the large capacity stacker 200*b* has completed the front loading process and becomes capable of receiving a discharged paper, the process proceeds to step S705 to perform a normal print process.

Next, when the completion of the print job and the completion of the print process in step S706 are detected (YES in step S706), the process proceeds to step S707. In step S707, the controller unit 205 determines whether there is an instruction for front loading after the completion of the print in the job settings obtained from the HD 209. When it is determined that there is not an instruction for front loading after the completion of the print (NO in step S707), the controller unit 205 completes the process.

On the other hand, when it is determined that there is an instruction for front loading after the completion of the print (YES in step S707), the process proceeds to step S708. In step S708, the controller unit 205 gives an front loading instruction to the large capacity stacker 200*b* and then completes the process.

Although the controller unit 205 determines in the exemplary embodiment only whether there is a front loading instruction before the start of the print of the job or after the completion of the print, the printing system 1000 may control the controller unit 205 to determine whether there is a front loading instruction at the start or the completion of each copy.

The user may similarly add an instruction for a front loading process at the start or the completion of each copy on the printer driver screen.

The printing system 1000 may also include an instruction for performing a front loading process at the completion of arbitrary number of copies, or an instruction for performing a front loading process at the completion of arbitrary number of pages.

Although the printing system 1000 is configured to give a front loading instruction from the printer driver in the present exemplary embodiment, the operation unit 204 of the printer may provide a setting of the timing for performing a front loading process as a device setting.

The controls described above enable the user to pull out a tray from the stacker at an arbitrary break point that the user intends. This can provide a printing system in which the user can efficiently eject the papers. In particular, the user can set a front loading instruction for a job to be input to the printing system 1000 even when the user has not given a front loading instruction at the previous job, or even when the user has forgotten giving a front loading instruction. As a result, the user can divide the print products to be printed by the execution of the job to be input after this from the print product printed already.

A second suitable exemplary embodiment of the present invention will be described.

Figure 8:
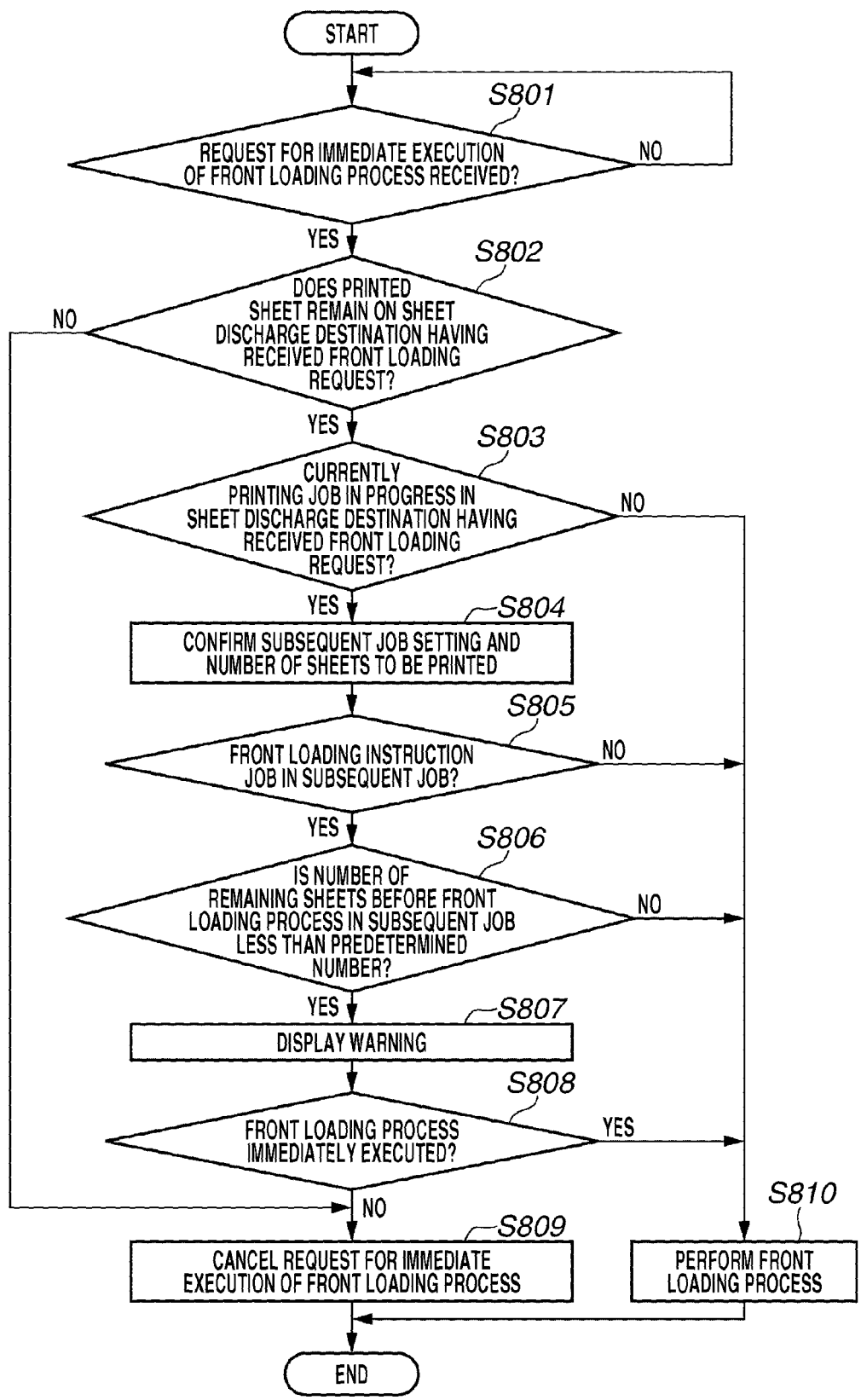
FIG. 8 is a flowchart of a method for controlling a printing system.

FIG. 8 is a flowchart of a method for controlling a printing system in the present exemplary embodiment. The present exemplary embodiment is an exemplary control when the user presses an open button 404 provided on a large capacity stacker 200*b* while a printing apparatus discharges papers to the large capacity stacker 200*b*. The controller unit 205 performs each procedure by reading and executing a program from the ROM 207.

In step S801, a controller unit 205 determines whether the controller unit 205 has received a request for an immediate execution of a front loading process from the large capacity stacker 200*b* when the user has pressed the open button 404 during a job process. When it is determined that the controller unit 205 has received a request for an immediate execution of a front loading process (YES in step S801), the process proceeds to step S802. In step S802, the controller unit 205 determines based on the output from a sensor (not illustrated in the drawings) whether there is a printed product on the paper discharge destination as to which the controller unit 205 has received the request for an immediate execution of a front loading process. When there is not a printed product (NO in step S802), the controller unit 205 determines that it is not necessary to execute the front loading process, and then the process proceeds to step S809.

When the controller unit 205 determines that there is a printed product on the paper discharge destination as to which the controller unit 205 has received the request for an immediate execution of a front loading process (YES in step S802), the process proceeds to step S803.

In step S803, the controller unit 205 determines whether the large capacity stacker 200*b* discharges the papers of the currently printed job to the paper discharge destination as to which the controller unit 205 has received the request of the front loading process. When it is determined that the large capacity stacker 200*b* does not currently discharge the papers to the paper discharge destination as to which the controller unit 205 has received the request of the front loading process (NO in step S803), the process proceeds to step S810 to execute the front loading process.

On the other hand, when it is determined that the large capacity stacker 200*b* currently discharges the papers to the paper discharge destination as to which the controller unit 205 has received the request (YES in step S803), the process proceeds to step S804. In step S804, the controller unit 205 obtains the setting of the job stored in the HD 209 and currently being discharged and the number of remaining sheets of the job to be printed, and the setting of each subsequent job to be executed stored in the HD 209 and the number of sheets to be printed in each of the subsequent jobs. Then, the process proceeds to step S805.

In step S805, the controller unit 205 determines whether there is a front loading instruction in the obtained subsequent jobs. When it is determined that there is not a front loading instruction in all the subsequent jobs (NO in step S805), the process proceeds to step S810 to execute a front loading process.

On the other hand, when it is determined that there is a front loading instruction in at least one or more of the subsequent jobs (YES in step S805), the process proceeds to step S806. In step S806, the controller unit 205 calculates the number of remaining sheets to be printed (the number of remaining sheets) until the execution of the next front loading instruction. The controller unit 205 calculates the number of remaining sheets to be printed, according to the number of pages of the job, the setting of one-sided printing/two-sided printing, and the setting of the reduction layout. For example, when a subsequent job 1 has 100 pages and is printed with the one-side printing and with the 1 in 1 printing, the controller unit 205 calculates the number of remaining sheets to be printed in the subsequent job 1 as 100 pages. Further, when a subsequent job 2 has 200 pages and is printed with the two-sided printing and with the 2 in 1 printing, the controller unit 205 calculates the number of remaining sheets to be printed in the subsequent job 2 as 50 pages from 200 pages/2 (two-sided printing)/2 (2 in 1). The controller unit 205 may calculate the number of remaining sheets in the currently executed job by subtracting the number of the already discharged sheets from the print number of sheets calculated in the same manner. When it is determined that the number of remaining sheets to be printed until the execution of the front loading process is a predetermined number or more, the controller unit 205 determines that the controller unit 205 can receive a request for an immediate execution of a front loading process. Then, the process proceeds to step S810. For example, when there is an instruction for a front loading process before the execution of the print of the subsequent job 2, the controller unit 205 calculates the number of remaining sheets to be printed from the number of remaining sheets in the currently executed job+100 sheets (the number of sheets to be printed in the subsequent job 1). On the other hand, when there is an instruction for a front loading process after the execution of the print of the subsequent job 2, the controller unit 205 can calculate the number of remaining sheets to be printed from the number of remaining sheets in the currently executed job+100 sheets (the number of sheets to be printed in the subsequent job 1)+50 sheets (the number of sheets to be printed in the subsequent job 2).

Figure 9:
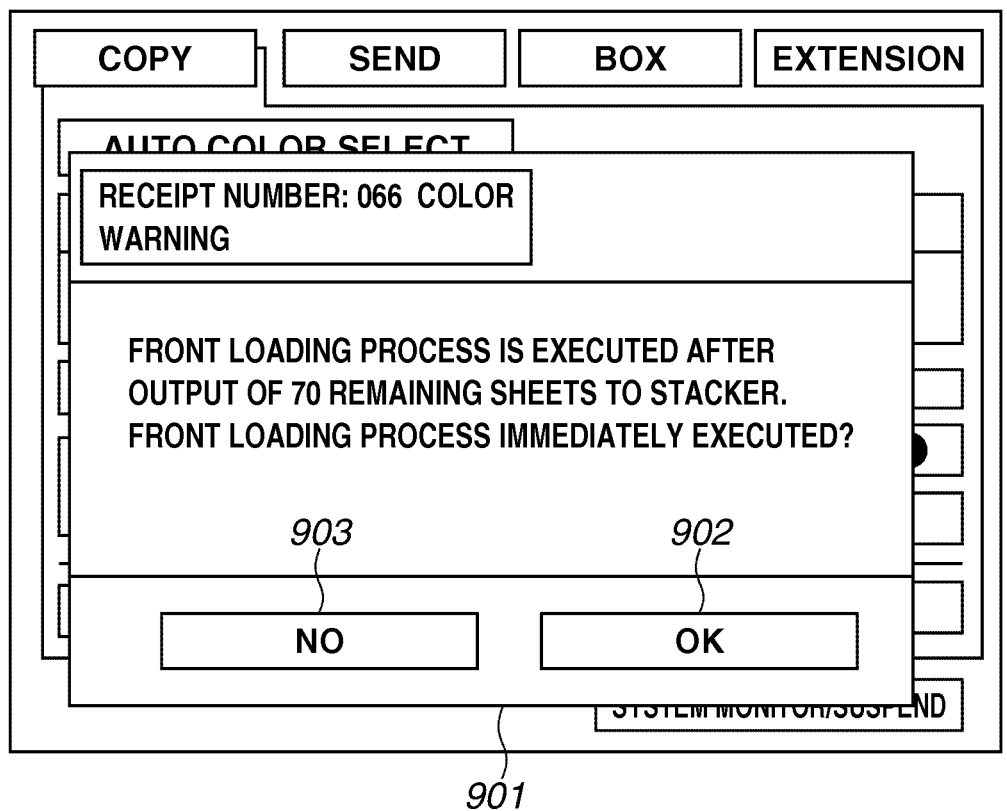
FIG. 9 is a diagram of a UI screen displayed on the operation unit illustrated in FIG. 2.

On the other hand, when it is determined that the number of remaining sheets to be printed is less than the predetermined number (YES in step S806), the process proceeds to step S807. In step S807, the controller unit 205 displays a warning screen 901 illustrated in FIG. 9 as popup on the operation unit 204 in order to notify the user that a front loading process is automatically executed soon. Then, the process proceeds to step S808. At that time, the warning screen 901 works as a confirmation screen on which the controller unit 205 receives an instruction for executing a process for ejecting the products.

When it is detected in step S808 that the user has pressed an OK button 902 in the warning screen 901 (YES in step S808), the process proceeds to step S810 to execute a front loading process. When it is detected that the user has pressed a NO button 903 in the warning screen 901 (NO in step S808), the process proceeds to step S809 to cancel the request for an immediate execution of a front loading process and complete the process.

Although the controller unit 205 determines whether to display the warning screen 901 based on the number of sheets to be output until the execution of the next front loading process in steps S804 and S806 in the present exemplary embodiment, the present invention is not limited to the present exemplary embodiment. The controller unit 205 may determine whether to display the warning screen 901 based on the number of jobs, number of copies, or length of time until the execution of the next front loading process.

Further, instead of using a predetermined number described above as a determination base, the controller unit 205 may determine whether to receive a request for an immediate execution of a front loading process based on the presence or absence of a job including a front loading process.

Although the controller unit 205 determines in step S806 whether to display the warning screen 901 based on a predetermined number, the user may designate (change) the predetermined number from the operation unit 204 or the client 104.

After determining step S805 that there is a front loading instruction in a subsequent job stored in the HD 209, the controller unit 205 may omit the process in step S806 and the process may proceed to step S807.

The configuration described above enables the user to efficiently pull out the tray even when the user presses the open button 404 on the large capacity stacker 200b at an arbitrary timing. Specifically, it is assumed that the user presses the open button 404 at the time before the job currently being output to the stacker will be completed in a case where the user has made a setting such that the tray is to be pulled out from the stacker at the completion of the job. The job currently being output will be completed when tens of remaining sheets are processed.

In that case, the user ejects the paper already discharged on the tray. This removes the processed products from the tray and the stacker can discharge papers on the tray again. Thus, the tray is automatically pulled out again because the job is completed after the tens of remaining sheets have been printed. On the other hand, the configuration in the present exemplary embodiment can notify to the user the information indicating that the tray will be pulled out only when the tray is pulled out soon. Thus, the user can efficiently eject the papers without uselessly pulling out the tray.

A typical flow of the control of the display on an operation unit 204 when a large capacity stacker 200b waits for the execution of a front loading process will be described as a third suitable exemplary embodiment of the present invention using FIGS. 10 and 11. A controller unit 205 displays the length of time until the execution of the next front loading process on the operation unit 204 based on the number of pages and print setting of a job stored in an HD 209 in the present exemplary embodiment. As a result, the user easily knows when the next front loading process is executed. The controller unit 205 calculates the length of time until the execution of the front loading process by dividing the number of remaining sheets to be printed until the execution of the front loading process described in the second exemplary embodiment, by the print speed. The controller unit 205 manages the calculated value by storing the value in the HD 209.

Figure 10:
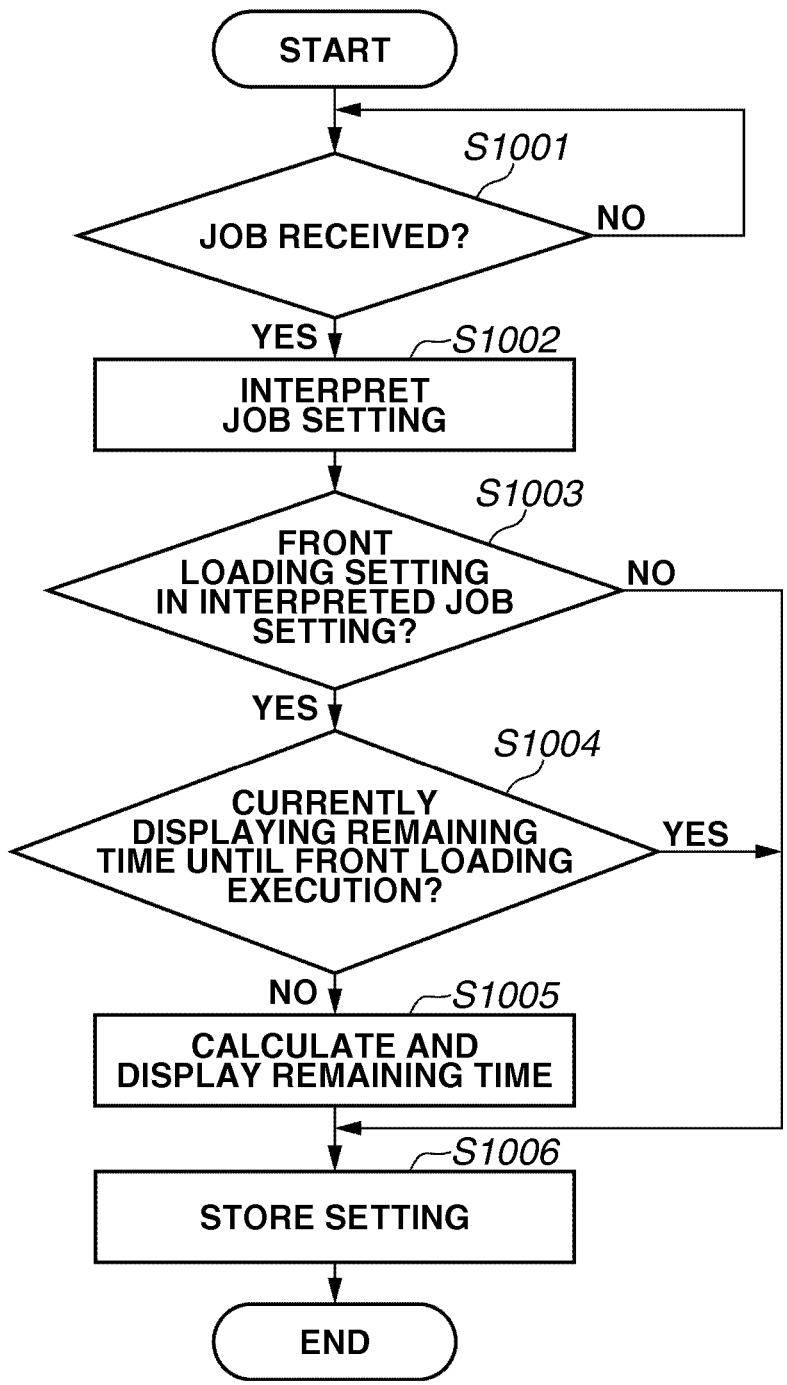
FIG. 10 is a flowchart of a method for controlling a printing system.

FIG. 10 is a flowchart of a method for controlling a printing system in the present exemplary embodiment. The present exemplary embodiment is an exemplary process that the controller unit 205 executes. The controller unit 205 performs each procedure by reading and executing a program from the ROM 207. The control performed when a printing apparatus discharges a paper to a stacker and the control performed when the user presses an open button 404 are the same as the controls in the first exemplary embodiment and the second exemplary embodiment. Thus, the descriptions of the controls are omitted.

In step S1001, the controller unit 205 waits until receiving a print job from the client 104 and the process proceeds to step S1002 after receiving a print job (YES in step S1001). In step S1002, the controller unit 205 interprets the setting of the print job received from the client 104 and the process proceeds to step S1003. In step S1003, the controller unit 205 determines whether there is a front loading setting in the interpreted settings. When it is determined that there is not a front loading setting (NO in step S1003), the process proceeds to step S1006 to store the setting interpreted in step S1002 in the HD 209 and complete the process.

On the other hand, when it is determined that there is a front loading setting (YES in step S1003), the process proceeds to step S1004. In step S1004, the controller unit 205 determines whether the operation unit 204 currently displays the remaining time until the execution of the front loading process. When the operation unit 204 currently displays the remaining time, the controller unit 205 determines that the front loading process is executed earlier than the received print job (YES in step S1004). Then, the process proceeds to step S1006.

On the other hand, when it is determined that the operation unit 204 does not currently display the remaining time (NO in step S1004), the process proceeds to step S1005. In step S1005, the controller unit 205 determines that the front loading instruction in the print job received from the client 104 is the latest timing of the execution of the front loading process. The controller unit 205 calculates the time of the execution of the front loading process by considering the remaining time before the completion of the already received print job and the timing of the execution of the front loading process. Then, the controller unit 205 displays the calculation result on the operation unit 204 and the process proceeds to step S1006. In step S1006, the controller unit 205 stores the setting interpreted in step S1002 in the HD 209. Then, the controller unit 205 completes the process.

Figure 11:
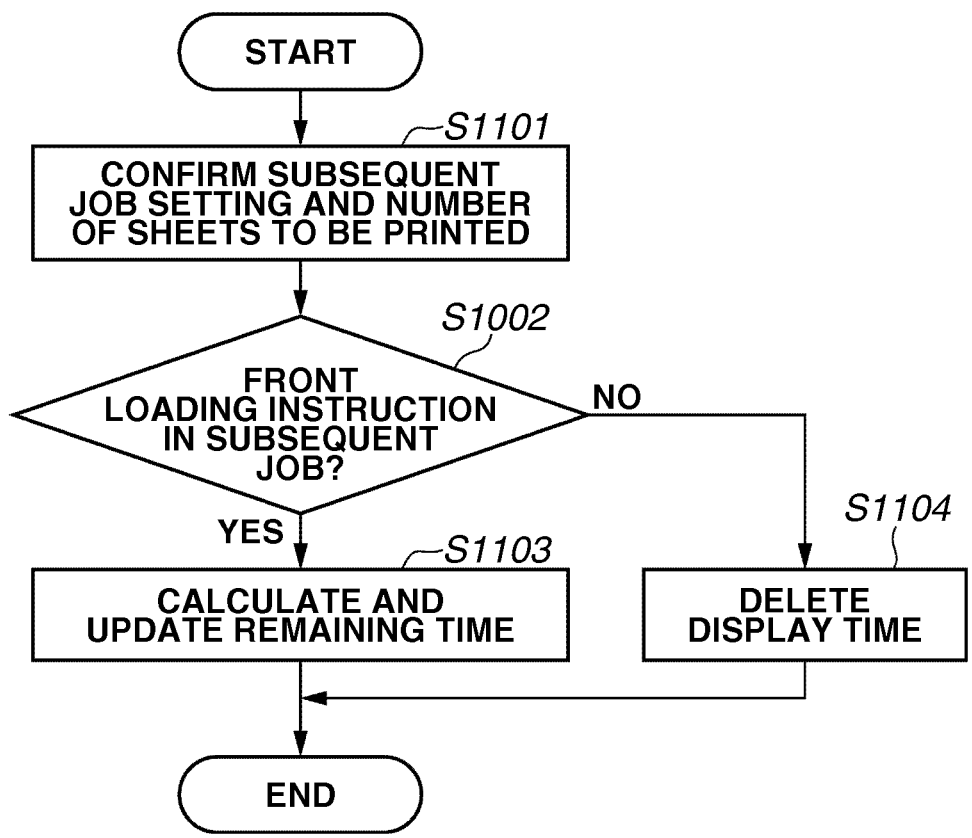
FIG. 11 is a flowchart of a method for controlling a printing system.

FIG. 11 is a flowchart of a method for controlling a printing system in the present exemplary embodiment.

The present exemplary embodiment is a typical control when the controller unit 205 executes a front loading process. The controller unit 205 performs each procedure by reading and executing a program from the ROM 207. The controller unit 205 executes the front loading process at the timing of, for example, step S704, S708, or S810 as described in the first and second exemplary embodiments. When executing the front loading process, the controller unit 205 obtains, in step S1101, the setting and number of sheets to be printed in each subsequent job that have been stored in the HD 209. Then, the process proceeds to step S1102.

In step S1102, the controller unit 205 determines whether there is a front loading instruction in the subsequent jobs in the obtained setting. When it is determined that there is a front loading instruction (YES in step S1102), the process proceeds to step S1103. On the other hand, when it is determined that there is not a front loading instruction (NO in step S1102), the process proceeds to step S1104.

In step S1103, the controller unit 205 detects the job to be printed earliest in the subsequent jobs in which there is a front loading instruction and then calculates the time until the execution of the front loading process. The controller unit 205 updates the display of the remaining time on the operation unit 204. Then, the controller unit 205 completes the process.

In step S1104, the controller unit 205 determines that there is not a request for the execution of a front loading process and deletes the display of the remaining time until the execution of a front loading process, from the operation unit 204. Then, the controller unit 205 completes the process.

Although the controller unit 205 controls the display of the time of the execution of a front loading process in the present exemplary embodiment, the present invention is not limited to the present exemplary embodiment. For example, when the operation unit 204 displays the time of the completion of the print in each print job, the operation unit 204 may display only the presence or absence of a front loading setting in each print job. As a result, the user can determine when the job including a front loading instruction is completed. Although the display device is the operation unit 204 in the present exemplary embodiment, the present invention is not limited to the present exemplary embodiment. For example, the large capacity stacker 200b may include the display device.

The configuration described above enables the user to know the time until the execution of the next front loading process. The user is also able to know the timing appropriate to press the open button 404 on the large capacity stacker 200b. Thus, the user can efficiently eject the processed products.

The present invention is not limited to the exemplary embodiments. The user can variously change the exemplary embodiments (can also organically combine the exemplary embodiments with each other) based on the gist of the present invention. Such modifications are not eliminated from the scope of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-256669 filed Nov. 22, 2012, which is hereby incorporated by reference herein in its entirety.

What is claimed is:

1. A printing apparatus comprising:
   a receiver configured to receive a print job from an information processing apparatus;
   a printer configured to print an image on a sheet based on the print job received by the receiver;
   a stacker configured to stack printed sheets on a first tray, wherein the stacker is capable of loading the printed sheets onto a second tray and then moving the second tray from a first position inside the stacker to a second position outside the stacker; and
   a controller configured to control the stacker based on the print job received by the receiver such that
   in a case where a first instruction for taking out sheets is set to the print job, printed sheets on the first tray are loaded onto the second tray before the print job and then the second tray is moved from the first position to the second position, and
   in a case where a second instruction for taking out sheets is set to the print job, printed sheets on the first tray are loaded onto the second tray after the print job and then the second tray is moved from the first position to the second position.

2. A control method for controlling an information processing apparatus, the control method comprising:
   making a predetermined setting to a first job, wherein the predetermined setting causes a sheet processing apparatus to move sheets on which images are printed according to a second job, which is performed prior to the first job, from a stacking unit on which the sheets have been stacked to a predetermined tray, wherein the sheet movement is performed before sheets on which images are printed according to the first job are stacked on the stacking unit, and the sheet movement enables a user to receive the sheets on which the images are printed according to the second job; and
   transmitting the first job, to which the predetermined setting has been made, to a printing apparatus.

3. The printing apparatus according to claim 1, wherein the stacker is provided with a cover, and the controller is configured to control the stacker to open the cover when printed sheets on the first tray is loaded onto the second tray and the second tray is moved from the first position to the second position.

4. The printing apparatus according to claim 1,
   wherein the controller determines whether printed sheets of preceding job are stacked on the first tray, and
   wherein, only when the printed sheets of preceding job are stacked on the first tray, the controller reloads the sheets stacked on the first tray to a second tray before starting a print processing of the print job.

5. A non-transitory computer-readable storage medium storing a program to cause a computer to perform a control method for controlling an information processing apparatus, the control method comprising:
   making a predetermined setting to a first job, wherein the predetermined setting causes a sheet processing apparatus to move sheets on which images are printed according to a second job, which is performed prior to the first job, from a stacking unit on which the sheets have been stacked to a predetermined tray, wherein the sheet movement is performed before sheets on which images are printed according to the first job are stacked on the stacking unit, and the sheet movement enables a user to receive the sheets on which the images are printed according to the second job; and
   transmitting the first job, to which the predetermined setting has been made, to a printing apparatus.

6. The printing apparatus according to claim 1, further comprising a display,
   wherein the controller determines whether the first instruction is set to a subsequent job that follows the print job and, in a case where it is determined that the first instruction is set to the subsequent job, the controller controls the display to display a screen for a user to confirm whether to remove the sheets stacked onto the first tray.

7. The printing apparatus according to claim 6, wherein the controller calculates, as a calculation result, a time period required for completing a remove processing of sheets and displays a calculation result on the display.

8. The printing apparatus according to claim 1, wherein the stacker further comprising an open button,
   wherein, according to a pressing of the open button performed by a user, the stacker reloads printed sheets from the first tray to the second tray and moves the second tray from the first position to the second position.

9. A system comprising:
   an information processing apparatus; and
   a printing apparatus,
   wherein the information processing apparatus comprises:
   a display configured to display an operation screen for a user to select whether to execute a sheets removing processing before starting a print processing, or to execute a sheets removing processing after completing a print processing; and
   a transmitting unit configured to transmit a print job set with a first instruction to the printing apparatus in a case where a user selects the processing to remove the sheets before starting the printing via the operation screen displayed by the display, and transmit a print job set with a second instruction to the printing apparatus in a case where a user selects the processing to remove the sheets after completing the printing via the operation screen displayed by the display,
   wherein the printing apparatus comprises:
   a receiver configured to receive a print job from an information processing apparatus,
   a printer configured to print an image on a sheet based on the print job received by the receiver,
   a stacker configured to stack printed sheets on a first tray, wherein the stacker is capable of loading the printed sheets onto a second tray and then moving the second tray from a first position inside the stacker to a second position outside the stacker, and
   a controller configured to control the stacker based on the print job received by the receiver such that
   in a case where the first instruction is set to the print job, printed sheets on the first tray are loaded onto the second tray before the print job and then the second tray is moved from the first position to the second position, and
   in a case where the second instruction is set to the print job, printed sheets on the first tray are loaded onto the second tray after the print job and then the second tray is moved from the first position to the second position.

10. A printing apparatus connected to a sheet stacking device for stacking printed sheets on a first tray, replacing the printed sheets on the first tray onto a second tray, and moving the second tray to a predetermined ejection position, the printing apparatus comprising:

a receiver configured to receive a print job from an information processing apparatus;

a printer configured to print an image on a sheet based on the print job received by the receiver; and a controller configured to control the sheet stacking device based on analysis result of the print job received by the receiver, wherein, in a case where a first instruction with respect to sheet ejection has been set to the print job received by the receiver, the controller controls the sheet stacking device to replace the printed sheets stacked on the first tray onto the second tray before starting the print job received by the receiver, and to move the second tray to the predetermined ejection position, and wherein, in a case where a second instruction with respect to the sheet ejection has been set to the print job received by the receiver, the controller controls the sheet stacking device to replace sheets, which are printed based on the print job received by the receiver, stacked on the first tray onto the second tray after completing the print job received by the receiver, and to move the second tray at the predetermined extraction position.

11. A printing apparatus comprising:

a receiver configured to receive a print job from an information processing apparatus;

a printer configured to print an image on a sheet based on the print job received by the receiver;

a sheet stacking device configured to stack the sheet, on which the image is printed by the printer, on a tray and capable of moving the tray to a predetermined ejection position; and a controller configured to control the sheet stacking device based on an analysis result of the print job received by the receiver, wherein, in a case where a first instruction with respect to sheet ejection has been set to the print job received by the receiver, the controller controls the sheet stacking device to move the tray to the predetermined ejection position before starting the print job, and wherein, in a case where a second instruction with respect to the sheet ejection has been set to the print job received by the receiver, the controller controls the sheet stacking device to move the tray to the predetermined ejection position after completing the print job.

12. A printing apparatus connected to a sheet stacking device for stacking printed sheets on a tray and capable of moving the tray to a predetermined extraction position, the printing apparatus comprising:

a receiver configured to receive a print job from an information processing apparatus;

a printer configured to print an image on a sheet based on the print job received by the receiver; and a controller configured to control the sheet stacking device based on analysis result of the print job received by the receiver, wherein, in a case where a first instruction with respect to sheet ejection has been set to the print job received by the receiver, the controller controls the sheet stacking device to move the tray to the predetermined ejection position before starting the print job, and wherein, in a case where a second instruction with respect to the sheet ejection has been set to the print job received by the receiver, the controller controls the sheet stacking device to move the tray to the predetermined ejection position after completing the print job.

13. A controlling apparatus connected to a printing apparatus that comprises a sheet stacking device having a first tray and a second tray, the controlling apparatus comprising:

a receiver configured to receive a print job; and a controller configured to control the printing apparatus to print an image on a sheet based on the print job received by the receiver, wherein, according to an instruction output from the controller, the sheet stacking device replaces sheets stacked on the first tray of the sheet stacking device to the second tray and moves the second tray to a predetermined ejection position, wherein the controller determines a timing of outputting the instruction to the sheet stacking device based on analysis result of the print job received by the receiver, and wherein the controller outputs the instruction to the sheet stacking device at least one of a timing before starting the print job and a timing after completing the print job.

14. A controlling apparatus connected to a printing apparatus that comprises a sheet stacking device having a tray, the controlling apparatus comprising:

a receiver configured to receive a print job; and a controller configured to control the printing apparatus to print an image on a sheet based on the print job received by the receiver, wherein, according to an instruction output from the controller, the sheet stacking device moves the tray, on which printed sheet is stacked, to a predetermined ejection position, wherein the controller determines a timing of outputting the instruction to the sheet stacking device based on analysis result of the print job received by the receiver, and wherein the controller outputs the instruction to the sheet stacking device at least one of a timing before starting the print job and a timing after completing the print job.

* * * * *